United States Patent

Lohrenz et al.

[11] Patent Number: 5,842,143
[45] Date of Patent: Nov. 24, 1998

[54] CIRCUIT CONFIGURATION FOR EVALUATING YAW RATE SENSOR SIGNALS

[75] Inventors: Frank Lohrenz; Frank Menten, both of Regensburg; Gregor Probst, Landshut, all of Germany

[73] Assignee: Siemens Aktiengesellschaft, Munich, Germany

[21] Appl. No.: 710,986

[22] Filed: Sep. 25, 1996

Related U.S. Application Data

[63] Continuation of PCT/EP95/00852, Mar. 8, 1995 published as WO95/26285, Oct. 5, 1995.

[30] Foreign Application Priority Data

Mar. 25, 1994 [DE] Germany .......................... 94104856.3

[51] Int. Cl.$^6$ ...................................................... B60T 8/00
[52] U.S. Cl. ............................................. 701/34; 701/77
[58] Field of Search ........................ 364/424.039, 426.016, 364/426.028, 426.027, 426.022; 303/140, 146; 701/34, 72, 83, 82, 77

[56] References Cited

U.S. PATENT DOCUMENTS

| | | | |
|---|---|---|---|
| 5,201,834 | 4/1993 | Grazoli et al. | 246/169 R |
| 5,285,390 | 2/1994 | Haseda et al. | 364/424.05 |
| 5,332,300 | 7/1994 | Hartmann et al. | 303/100 |
| 5,341,297 | 8/1994 | Zomotor et al. | 364/426.03 |
| 5,386,365 | 1/1995 | Nagaoka | 364/424.05 |
| 5,410,477 | 4/1995 | Ishii et al. | 364/424.01 |
| 5,457,632 | 10/1995 | Tagawa et al. | 364/424.05 |
| 5,668,724 | 9/1997 | Ehret et al. | 701/80 |

FOREIGN PATENT DOCUMENTS

4300844A1  7/1993  Germany .

*Primary Examiner*—Michael Zanelli
*Attorney, Agent, or Firm*—Herbert L. Lerner; Laurence A. Greenberg

[57] ABSTRACT

A circuit configuration for evaluating signals from a yaw rate sensor is used in particular for movement stabilization in a motor vehicle. There is provided a controller which receives the signals from the yaw rate sensor and from further sensors. The further sensors detect motion state dependent variables, such as for example wheel speed, steering wheel angle, lateral acceleration and longitudinal acceleration. The controller calculates from one or more of these further sensors a reference yaw rate. The reference yaw rate is compared with the yaw rate measured by the yaw rate sensor. The plausibility of the yaw rate sensor signal is also checked, taking account of the motion state. If the difference between the measured yaw rate and the reference yaw rate determined in the plausibility check is above a predetermined threshold value, then the yaw rate sensor is identified as being faulty.

6 Claims, 2 Drawing Sheets

CIRCUIT CONFIGURATION FOR EVALUATING YAW RATE SENSOR SIGNALS

CROSS-REFERENCE TO RELATED APPLICATION

This application is a continuation of international application PCT/EP95/00852, filed Mar. 8, 1995, published as WO95/26285, Oct. 5, 1995, which designated the United States.

BACKGROUND OF THE INVENTION

FIELD OF THE INVENTION

The invention relates to a circuit configuration for evaluating the output signals from a yaw rate sensor, in particular for movement stability regulation in a motor vehicle; the configuration has a controller, which receives the output signals from the yaw rate sensor;

which receives the signals from at least one further sensor, which detects motion state dependent variables;

which calculates a reference yaw rate from these signals; and determines a difference between the reference yaw rate and the yaw rate measured by the yaw rate sensor and compares the same with a predetermined threshold value.

Such a configuration can be used, for example, in a yaw regulator with which the movement stability of a motor vehicle is improved, for example to compensate for incorrect movement maneuvers by the driver or as a result of a side impact wind. A yaw movement is a rotation of the motor vehicle about its vertical axis, i.e., about an axis running at right angles to the roadway surface, through the center of gravity of the vehicle.

Vehicle manipulated variables for yaw regulation can be either asymmetric braking of the vehicle by operating the brakes exclusively on one side of the vehicle or with a different intensity on one side of the vehicle, or by adjustment of the rear axle steering angle in the case of a motor vehicle having rear wheel steering.

In the case of a known device for regulation of the vehicle movement, the influence of destabilizing forces on the vehicle is determined by measurement of a current "yaw level", a desired yaw level is determined and is compared with the current yaw level, and the brakes are operated in accordance with the comparison results, in order to keep the vehicle stable (German patent publication DE 39 19 347 A1).

The yaw rate is measured using a yaw or rotation rate sensor (also called a yaw rate sensor). The yaw rate is represented as an electrical signal in the form of the yaw rate sensor output signal. The quality of the sensor which is used is the governing factor determining the accuracy of the movement stabilization. Economically mass-produced yaw rate sensors which can be used in motor vehicles are based, for example, on the principle of measurement of the influence of the Coriolis force on a vibrating ceramic structure (Fox, C. H. J.: Vibrating Cylinder Gyro—Theory of Operation and Error Analysis. University of Stuttgart Gyro Symposium, September 1988) or on a component like a tuning fork (JEE, September 1990, pages 99–104).

The major technical problem in particular in the case of cost-effective sensors is that the characteristic parameters (gradient and zero ordinate) are heavily dependent on the temperature and that this temperature dependency is itself subject to a high degree of scatter from sensor to sensor in the case of mass-produced sensors. This problem is solved by a circuit configuration which is described in the commonly assigned, copending application Ser. No. 08/656,413, filed May 30, 1996 now abandoned.

The number of sensors which are currently available on the market for automobile use is limited to a few. The technology is still in its infancy. There are various basic structures for the vibrating parts of the sensors: ceramic cylinders made of sintered material, metallic rings with a complex spoke structure for mounting, and tuning fork structures made of metal. The basic materials are caused to oscillate by bonded-on piezoceramic components or, in the case of the metallic ring, by magnetic excitation. The signals are likewise extracted via bonded-on piezoceramic components, or inductively in the case of the metallic rings. The currently available sensors are produced by micromachines, but there are not yet any silicon sensors made by micromachines, as in the case of acceleration sensors for example.

Sensor manufacturers have admittedly carried out complex mechanical fault analyses of the sensor elements, but no sensor manufacturer can guarantee complete reliability over the entire life of the sensor. For the sensor there is admittedly the requirement for characteristic limitation in the functional state and for a rigidly defined voltage range in the event of a fault, but there are sensor failures which cannot be identified by downstream evaluation electronics. Any increase in the sensor reliability requires high complexity, for example in the form of electronic monitoring circuits for the individual sensor.

SUMMARY OF THE INVENTION

It is accordingly an object of the invention to provide a circuit configuration for evaluating yaw rate sensor signals, which overcomes the above-mentioned disadvantages of the heretofore-known devices and methods of this general type and which reduces the circuit complexity for monitoring the sensors, in that the monitoring is carried out under program control by a computer which is present anyway in the controller which evaluates the sensor signals.

With the foregoing and other objects in view there is provided, in accordance with the invention, a circuit configuration for evaluating signals from a yaw rate sensor, comprising:

a controller connected to and receiving a yaw rate signal from a yaw rate sensor;

the controller being connected to and receiving signals from at least one further sensor sensing motion state dependent variables, and the controller calculating a reference yaw rate from the signals;

the controller being programmed to calculate a difference between the reference yaw rate and the yaw rate signal received from the yaw rate sensor and to compare the difference with a predetermined threshold value; and the controller outputting a state signal indicating a state of the yaw rate sensor depending on a result of the comparison.

In other words, the signals from at least one sensor—in most cases a plurality of sensors—are supplied to the controller. The sensor or sensors detect the motion state dependent variables, such as the steering wheel angle, the angular speed of the wheels, the lateral acceleration and the longitudinal acceleration, etc. A reference yaw rate is calculated from these signals by the controller and is compared with the yaw rate which is measured by the sensor. In addition, a plausibility check is carried out relating to the yaw rate sensor signal. If, with given plausibility, the difference between the two yaw rates is greater than a predetermined value, then the sensor is regarded as being faulty and an appropriate diagnosis bit is set.

In accordance with an added feature of the invention, the controller is connected in a system for movement stabilization in a motor vehicle.

In accordance with an additional feature of the invention, the controller performs a plausibility check ascertaining whether the signal from the yaw rate sensor is plausible in view of a motion state of the vehicle, and the controller comparing the difference with the threshold value in dependence on a result of the plausibility check.

In accordance with a further feature of the invention, the controller receives signals from a plurality of yaw rate sensors and forms the reference yaw rate as a sum of a plurality of yaw rate values calculated from the signals from the plurality of sensors, each weighted by a respective weighting factor.

In accordance with another feature of the invention, the controller includes a fuzzy logic circuit for determining the weighting factors for weighting the yaw rate values.

In accordance with again another feature of the invention, the reference yaw rate is calculated using at least one of several formulae which are detailed in the following description.

With the above and other objects in view there is also provided, in accordance with the invention, a method of evaluating signals from a yaw rate sensor, the method which comprises: receiving a yaw rate signal from a yaw rate sensor with a controller connected to the yaw rate sensor; receiving, with the controller, signals from at least one further sensor sensing motion state dependent variables, and calculating a reference yaw rate from the signals; calculating a difference between the reference yaw rate and the yaw rate signal and comparing the difference with a predetermined threshold value; and outputting a state signal indicating a state of the yaw rate sensor depending on a result of the comparing step.

It is advantageous that various algorithms can be used, depending on the respective motion situation, in order to calculate the yaw rate from various motion-specific state variables. The changeover between the algorithms is advantageously carried out using a fuzzy logic circuit.

State variables can not only be measured using sensors but can also be derived from a vehicle mathematical model which is stored in the controller.

Other features which are considered as characteristic for the invention are set forth in the appended claims.

Although the invention is illustrated and described herein as embodied in a circuit configuration for evaluating yaw rate sensor signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
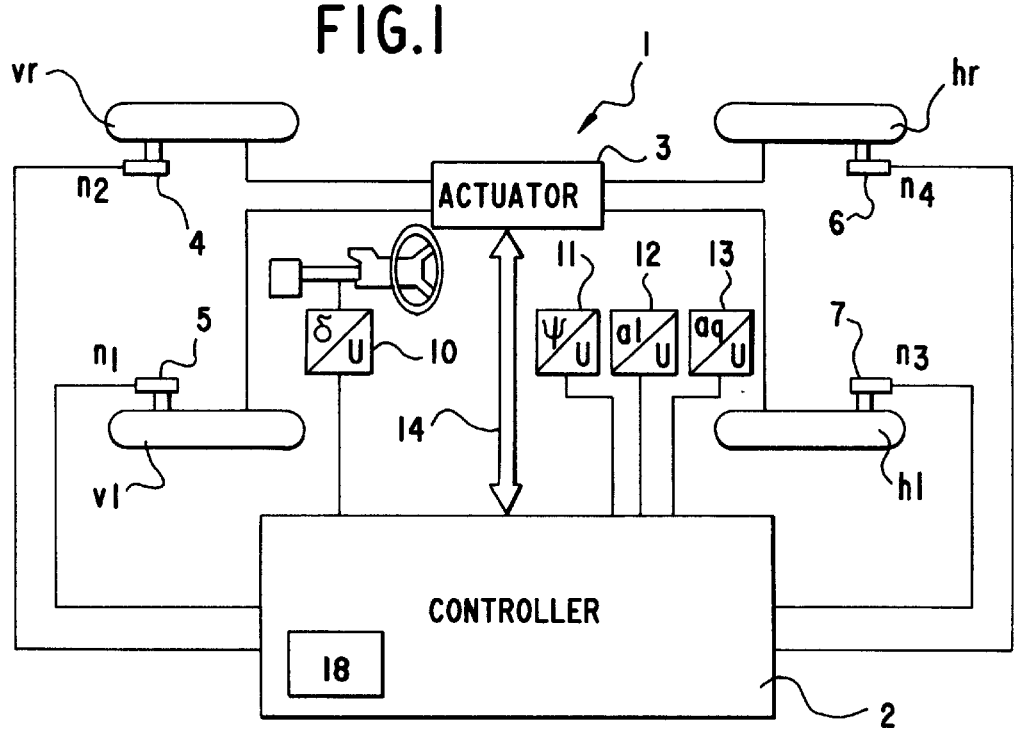
FIG. 1 is a schematic view of a motor vehicle equipped with a configuration according to the invention with a controller.

Referring now to the figures of the drawing in detail and first, particularly, to FIG. 1 thereof, there is seen a motor vehicle 1 equipped with a circuit configuration for evaluating the output signals from a yaw rate sensor which is a component of a yaw rate control loop. The control loop includes an electronic controller 2, an actuator 3 and a plurality of sensors: Four wheel rotation speed sensors 4 to 7, which measure the wheel speeds of the front left wheel vl, of the front right wheel vr, of the rear left wheel hl and of the rear right wheel hr, respectively. In addition, there are provided a steering wheel angle sensor 10, a yaw rate sensor 11, a longitudinal acceleration sensor 12 and a lateral acceleration sensor 13. The circuit configuration may also include further sensors, which are not illustrated here for clarity.

The actuator 3 receives, via a signal line or a signal bus 14, control signals from the electronic controller 2 and then produces yaw moments, i.e., torques about the vertical axis of the motor vehicle 1. This can be done, for example, by braking with different intensity on the left vehicle side and on the right vehicle side, or else by steering the rear axle of the motor vehicle. The actuator 3 and the sensors 4 to 13 are known per se and they will therefore not be described in any further detail here. The controller 2 receives the following sensor variables or signals from them:

| | |
|---|---|
| $\delta_l$ | Steering wheel angle, signal from sensor 10 |
| $\dot{\psi}$ | Yaw angle rate, signal from sensor 11 |
| $a_l$ | Longitudinal acceleration, signal from sensor 12 |
| $a_q$ | Lateral acceleration, signal from sensor 13 |
| $n_1$ | Wheel rotation speed, front left, signal from sensor 5 |
| $n_2$ | Wheel rotation speed, front right, signal from sensor 4 |
| $n_3$ | Wheel rotation speed, rear left, signal from sensor 7 |
| $n_4$ | Wheel rotation speed, rear right, signal from sensor 6 |

The yaw rate of the motor vehicle can be calculated in a different way from the sensor signals described above, to be precise subject to predetermined preconditions. Formulae A1 to A12 (more generally there may be up to An formulae) are illustrated below. Each of these formulae corresponds to an algorithm which is applicable to a rigidly defined value range of the sensor signals.

$$\dot{\psi} = \frac{(v_{lh} - v_{rh})}{s_H} \quad \text{A1}$$

$$\dot{\psi} = \frac{(v_{lv} - v_{rv})}{s_V} \quad \text{A2}$$

$$\dot{\psi} = v_{Hi} \frac{\tan\delta_V}{l} \quad \text{A3}$$

$$\dot{\psi} = v_{Vi} \frac{\sin\delta_V}{l} \quad \text{A4}$$

-continued $$\dot\psi = \frac{v_{Ha}}{\frac{l}{\tan\delta_V}} + S_H \quad \text{A5}$$

$$\dot\psi = \frac{v_{Va}}{\frac{l}{\sin\delta_V}} + S_V \quad \text{A6}$$

$$\dot\psi = \frac{1}{i_L} \frac{v}{1+\frac{v^2}{v_{ch}^2}} \delta_L \quad \text{A7}$$

$$\dot\psi = \frac{a_q}{\overline{v}_{front}} \quad \text{A8}$$

$$\dot\psi = \frac{a_q}{\overline{v}_{rear}} \quad \text{A9}$$

$$\dot\psi = \frac{a_q}{\overline{v}_{cross\_rv\_lh}} \quad \text{A10}$$

$$\dot\psi = \frac{a_q}{\overline{v}_{cross\_lv\_rh}} \quad \text{A11}$$

$$\dot\psi = \sqrt{\frac{\delta_L a_q}{i_L l} + \frac{a_q^2}{v_{ch}^2}} \quad \text{A12}$$

Where the variables in equations A1 to A12 are as follows:

| | |
|---|---|
| $\dot\psi$ | Yaw rate |
| $v_{lh}$ | Wheel speed, left rear |
| $v_{rh}$ | Wheel speed, right rear |
| $v_{lv}$ | Wheel speed, left front |
| $v_{rv}$ | Wheel speed, right front |
| $v_{Hi}$ | Wheel speed, inside wheel during a turn (rear) |
| $v_{Vi}$ | Wheel speed, inside wheel during a turn (front) |
| $v_{Ha}$ | Wheel speed, outside wheel during a turn (rear) |
| $v_{Va}$ | Wheel speed, outside wheel during a turn (front) |
| $\overline{v}_{front}$ | Average speeds, front axle wheels |
| $\overline{v}_{rear}$ | Average speeds, rear axle wheels |
| $\overline{v}_{cross\_rv\_lh}$ | Average speed (right front wheel speed, left rear wheel speed) |
| $\overline{v}_{cross\_lv\_rh}$ | Average speed (left front wheel speed, right rear wheel speed) |
| $v$ | Speed, general (vehicle speed at the center of gravity) |
| $v_{ch}$ | Characteristic vehicle speed |
| $a_q$ | Lateral acceleration |
| $\delta_L$ | Steering wheel angle |
| $\delta_V$ | Front wheel lock angle (steering angle) |
| $l$ | Wheelbase |
| $S_V$ | Track width, front |
| $S_H$ | Track width, rear |
| $i_L$ | Steering ratio |

A plurality of vehicle mathematical models can be stored in a memory, which is not illustrated in the drawing, of the controller. These models use input variables to supply state signals which replace the sensor signals in the above equations. The validity ranges of the sensor signals are described in the following text.

When determining the yaw rate from the steering angle and the wheel rotation speeds (Formulae A3 to A6) the signals from the four wheel rotation speed sensors 4 to 7 being processed, the validity range which has been determined on the basis of driving trials and error estimates is as follows:

$0 \leq$ Wheel speed $\leq 18$ km/h $0 \leq$ Lateral acceleration $\leq 2.8$ m/s$^2$ When determining the yaw rate just by evaluation of the wheel rotation speeds (Formulae A1 and A2), the signals of the four wheel rotation speed sensors 4 to 7 once again being processed, the validity range is governed by the requirement for low wheel slip and for predetermined wheel slip angles.

When determining the yaw rate from a linear single-track model (Formula A7), the signals from the steering wheel angle sensor and a vehicle reference speed being processed, the validity range is defined by the following conditions:

small roll angle, small attitude angle change $\dot\beta = 0$, small yaw angle acceleration $\ddot\Psi = 0$, and limited lateral acceleration $|\alpha_q| \leq 4$ m/s$^2$.

When determining the yaw rate from signals from the longitudinal and the lateral acceleration sensors 12, 13 using the linear single-track model (averaged Formulae A8 and A9), the vehicle reference speed and the lateral acceleration signals being processed, the validity range is defined by the following conditions:

small roll angle, small attitude angle change $\dot\beta = 0$, small yaw angle acceleration $\ddot\Psi = 0$, influence of the earth's acceleration on the acceleration sensor, and limited lateral acceleration $|\alpha_q| \leq 4$ m/s$^2$.

When determining the yaw rate from averaged wheel rotation speeds and from signals from the longitudinal and lateral acceleration sensors 12, 13 using the linear single-track model (Formula A8 and Formula A9), the transverse acceleration signals and the signals from the four wheel rotation speed sensors 4 to 7 being processed, the validity range is defined by the following conditions:

small roll angle, small attitude angle change $\dot\beta = 0$, small yaw angle acceleration $\ddot\Psi = 0$, vehicle must move on level plane, and limited lateral acceleration $|\alpha_q| \leq 4$ m/s$^2$.

When determining the yaw rate from the lateral acceleration and the steering wheel angle, the lateral acceleration sensor signals and the steering angle sensor signals being processed (Formula A12), the validity range is likewise defined by the following conditions:

small roll angle, small attitude angle change $\dot\beta = 0$, small yaw angle acceleration, $\ddot\Psi = 0$, vehicle must move on level plane, and limited lateral acceleration $|\alpha_q| \leq 4$ m/s$^2$.

Figure 2:
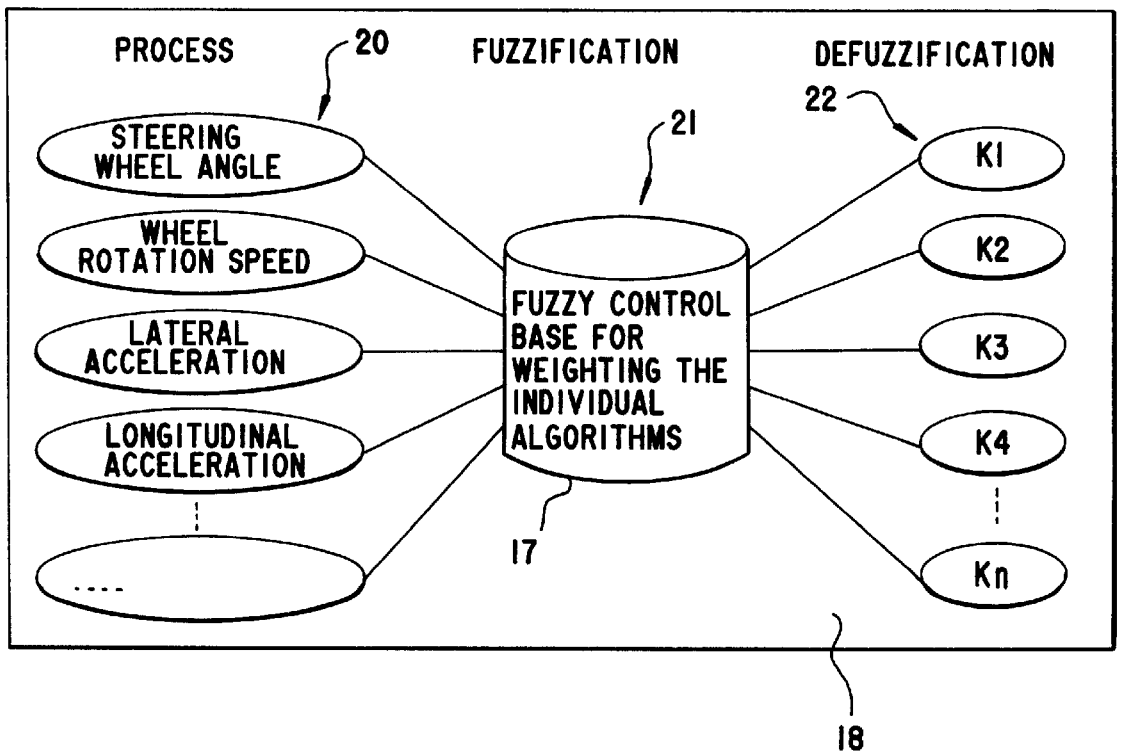
FIG. 2 is a circuit schematic of a fuzzy logic circuit as a component of the controller in FIG. 1.

The preconditions for which the algorithms in Formulae A1 to A12 (or An) can be used for the calculation of the yaw rate and the value ranges for which they are valid are stored in the control base 17 of a fuzzy logic circuit 18 (FIG. 2). This control circuit 18 is a component of the controller 2 (cf. FIG. 1).

Fuzzy logic circuits are known per se. The logic circuit 18 will be explained here only to the extent which is necessary for the function of the monitoring circuit according to the invention. Said logic circuit 18 has a process section 20, fuzzification 21, and defuzzification 22. The input variables of the fuzzy logic circuit 18 are the motion state variables which characterize the motion process: the steering wheel angle,-wheel rotation speeds, lateral acceleration, longitudinal acceleration etc. As stated, they may originate from sensor signals or from a stored vehicle model. The fuzzification, that is to say the conversion into fuzzylogic variables, is carried out in the fuzzy control base 17 and the evaluation is carried out using the expert knowledge stored there. The output signals from the fuzzy control base 17 are defuzzified and are output from the logic circuit 18 as the following output variables: K1, K2, K3, K4, . . . Kn. These output variables are gain factors, with which the individual addition terms which represent the result of Equations A1 to An are weighted.

$$\dot{\Psi}_{ref}=K1*A1+K2*A2+\ldots +K12*A12+\ldots +Kn*An \quad\quad A13$$

Figure 3:
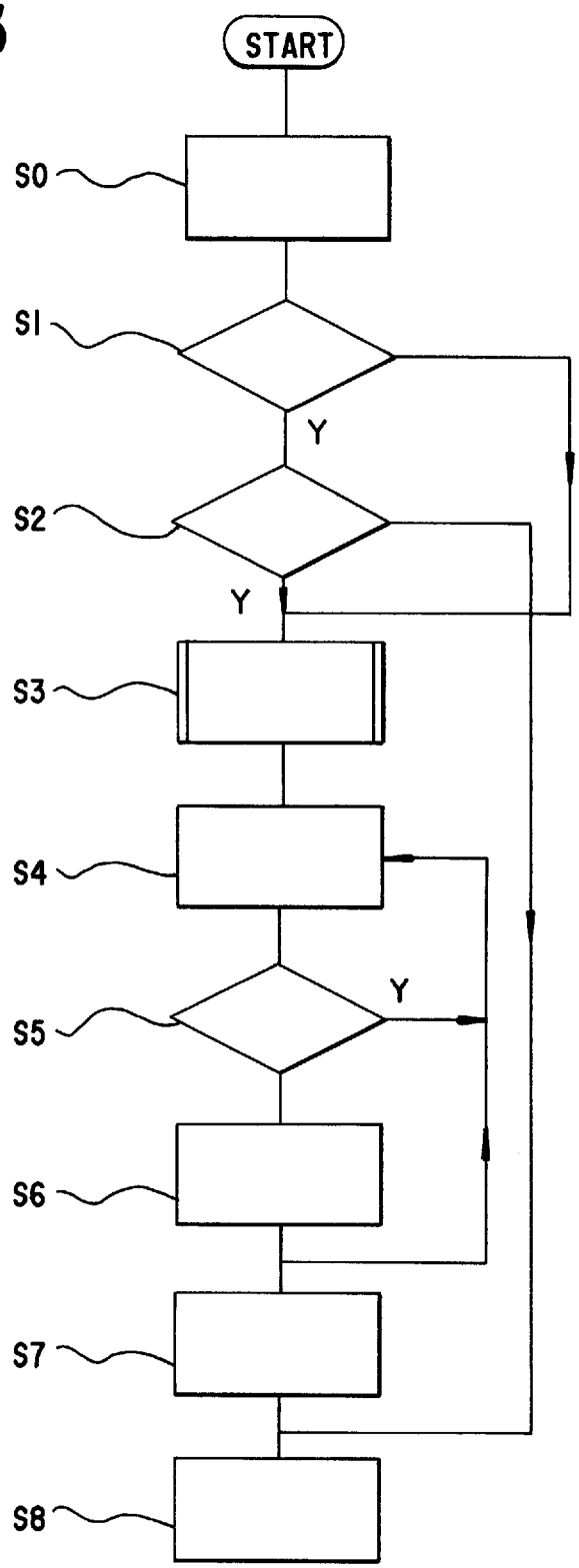
FIG. 3 is a flow chart of a program with which the controller monitors the yaw rate sensor.

The yaw rate is evaluated within one cycle of the yaw rate determination in that the algorithms for the equations A1 to A13 are processed as can be seen from the flow diagram in FIG. 3.

After the Start, the signal voltages from the sensors 10 to 13 which are used (steering wheel angle sensor, lateral acceleration sensor, longitudinal acceleration sensor, yaw rate sensor) are read in and filtered in a step So, in order to exclude random signal voltage fluctuations.

A check is carried out on the basis of the vehicle state variables in a step S1 to determine whether a plausibility check can be carried out, to be precise by checking a plurality of plausibility conditions. One example of a plausibility condition is as follows:

If, for example, the condition "vehicle stationary" in S1 is satisfied—a plausibility check may thus be carried out—the measured yaw rate should be in a rigidly predetermined tolerance band about zero.

If no plausibility check can be carried out, because the vehicle state variables are not in the valid range, a jump is made to step S3.

If a plausibility check can be carried out, it is carried out in step S2.

The following plausibility checks are possible:

The change in the steering wheel angle is equal, in a predetermined tolerance band, to the change in the measured yaw rate in a predetermined tolerance band, to be precise at a constant vehicle speed not equal to zero.

The change in the lateral acceleration is equal, in a predetermined tolerance band, to the change in the measured yaw rate in a predetermined tolerance band, to be precise at a constant vehicle speed.

If the result of this plausibility check is good, a jump is made to step S3, otherwise a jump is made to step S8.

The gain factors (K1, . . . , Kn) which are associated with the respective addition terms are determined in step S3, by evaluation in the fuzzy control base.

Within a loop formed by steps S4 to S6, step S5 tests whether the respective gain factor (K1, . . . , Kn) is equal to zero. If the gain factor is not equal to zero, the yaw rate associated with the respective gain factor is calculated in a next step S6.

The individual components of the multiplication of the respective yaw rate by the respective gain factor are added up in a step S7 to form the reference yaw rate $\dot{\Psi}_{ref}$.

Finally, a yaw rate sensor diagnosis bit, which indicates whether the sensor has been classified as serviceable or faulty, is set in a step S8 depending on the absolute difference $\Delta\dot{\Psi}=|\dot{\Psi}-\dot{\Psi}_{ref}|$ between the determined yaw rate and the measured yaw rate, and as a function of the result of the plausibility check.

We claim:

1. A circuit configuration for evaluating signals from a yaw rate sensor, comprising:

a controller connected to and receiving a yaw rate signal from a yaw rate sensor;

said controller being connected to and receiving signals from a plurality of further sensors sensing motion state dependent variables, and said controller calculating a reference yaw rate as a sum of a plurality of yaw rate values calculated from the signals from said plurality of further sensors, each weighted by a respective weighting factor;

said controller being programmed to calculate a difference between the reference yaw rate and the yaw rate signal received from the yaw rate sensor and to compare the difference with a predetermined threshold value; and said controller outputting a state signal indicating a state of the yaw rate sensor depending on a result of the comparison.

2. The circuit configuration according to claim 1, wherein said controller is connected in a system for movement stabilization in a motor vehicle.

3. The circuit configuration according to claim 1, wherein said controller includes a fuzzy logic circuit for determining the weighting factors for weighting the yaw rate values.

4. The circuit configuration according to claim 1, wherein the reference yaw rate is calculated using at least one of the following formulae:

$$\dot{\Psi} = \frac{(v_{lh} - v_{rh})}{s_H} \quad\quad A1$$

$$\dot{\Psi} = \frac{(v_{lv} - v_{rv})}{s_V} \quad\quad A2$$

$$\dot{\Psi} = v_{Hi}\frac{\tan\delta_V}{l} \quad\quad A3$$

$$\dot{\Psi} = v_{Vi}\frac{\sin\delta_V}{l} \quad\quad A4$$

$$\dot{\Psi} = \frac{v_{Ha}}{\frac{l}{\tan\delta_V} + s_H} \quad\quad A5$$

$$\dot{\Psi} = \frac{v_{Va}}{\frac{l}{\sin\delta_V} + s_V} \quad\quad A6$$

$$\dot{\Psi} = \frac{1}{li_l} \frac{v}{1+\frac{v^2}{v_{ch}^2}} \delta_L \quad\quad A7$$

$$\dot{\Psi} = \frac{a_q}{v_{front}} \quad\quad A8$$

$$\dot{\Psi} = \frac{a_q}{v_{rear}} \quad\quad A9$$

$$\dot{\Psi} = \frac{a_q}{v_{cross\_rv\_lh}} \quad\quad A10$$

$$\dot{\Psi} = \frac{a_q}{v_{cross\_lv\_rh}} \quad\quad A11$$

$$\dot{\Psi} = \sqrt{\frac{\delta_L a_q}{i_L l} + \frac{a_q^2}{v_{ch}^2}} \quad\quad A12$$

wherein:

-continued

| | |
|---|---|
| $\dot{\psi}$ | Yaw rate |
| $v_{lh}$ | Wheel speed, left rear |
| $v_{rh}$ | Wheel speed, right rear |
| $v_{lv}$ | Wheel speed, left front |
| $v_{rv}$ | Wheel speed, right front |
| $v_{Hi}$ | Wheel speed, inside wheel during a turn (rear) |
| $v_{Vi}$ | Wheel speed, inside wheel during a turn (front) |
| $v_{Ha}$ | Wheel speed, outside wheel during a turn (rear) |
| $v_{Va}$ | Wheel speed, outside wheel during a turn (front) |
| $\bar{v}_{front}$ | Average speeds, front axle wheels |
| $\bar{v}_{rear}$ | Average speeds, rear axle wheels |
| $\bar{v}_{cross\_rv\_lh}$ | Average speed (right front wheel speed, left rear wheel speed) |
| $\bar{v}_{cross\_lv\_rh}$ | Average speed (left front wheel speed, right rear wheel speed) |
| $v$ | Speed, general (vehicle speed at the center of gravity) |
| $v_{ch}$ | Characteristic vehicle speed |
| $a_q$ | Lateral acceleration |
| $\delta_L$ | Steering wheel angle |
| $\delta_V$ | Front wheel lock angle (steering angle) |
| $l$ | Wheelbase |
| $S_V$ | Track width, front |
| $S_H$ | Track width, rear |
| $i_L$ | Steering ratio. |

5. A circuit configuration for evaluating signals from a yaw rate sensor, comprising:

a controller connected to and receiving a yaw rate signal from a yaw rate sensor;

a system for movement stabilization in a motor vehicle connected to said controller;

said controller being connected to and receiving signals from at least one further sensor sensing motion state dependent variables, and said controller calculating a reference yaw rate from the signals;

said controller performs a plausibility check ascertaining whether the signal from the yaw rate sensor is plausible in view of a motion state of the vehicle;

said controller being programmed to calculate a difference between the reference yaw rate and the yaw rate signal received from the yaw rate sensor and to compare a difference with a predetermined threshold value, and said controller comparing the difference with the predetermined threshold value in dependence on a result of the plausibility check;

said controller outputting a state signal indicating a state of the yaw rate sensor depending on a result of the comparison.

6. A method of evaluating signals from a yaw rate sensor, the method which comprises:

receiving a yaw rate signal from a yaw rate sensor with a controller connected to the yaw rate sensor;

receiving, with the controller, signals from a plurality of further sensors sensing motion state dependent variables, and calculating a reference yaw rate as a sum of a plurality of yaw rate values calculated from the signals from said plurality of sensors, each weighted by a respective weighting factor;

calculating a difference between the reference yaw rate and the yaw rate signal and comparing the difference with a predetermined threshold value; and outputting a state signal indicating a state of the yaw rate sensor depending on a result of the comparing step.

* * * * *